United States Patent [19]  
Sprague et al.

[11] Patent Number: 4,538,883  
[45] Date of Patent: Sep. 3, 1985

[54] CONFORMABLE ELECTRODES FOR PROXIMITY COUPLED ELECTRO-OPTIC DEVICES

[75] Inventors: Robert A. Sprague, Saratoga; William D. Turner, San Marino, both of Calif.

[73] Assignee: Xerox Corporation, Stamford, Conn.

[21] Appl. No.: 498,388

[22] Filed: May 26, 1983

[51] Int. Cl.³ .............................................. G02F 1/03
[52] U.S. Cl. .................................... 350/356; 350/360
[58] Field of Search ................ 350/392, 355, 356, 360

[56] References Cited

U.S. PATENT DOCUMENTS 4,367,925  1/1983  Sprague et al. ...................... 350/355
4,370,029  1/1983  Sprague et al. ...................... 350/355
4,380,373  4/1983  Sprague .............................. 350/356

FOREIGN PATENT DOCUMENTS 0062522 10/1982 European Pat. Off. .
0051356 12/1982 European Pat. Off. .
0075435  3/1983 European Pat. Off. .

Primary Examiner—Bruce Y. Arnold

[57] ABSTRACT

The electrodes of a proximity coupled, multigate electro-optic light valve are overcoated with a soft, conformable composition which flows in its solid state to conform to the electro-optic element of the light valve when the electrodes are pressed thereagainst. For example, standard semiconductor fabrication techniques may be utilized to fabricate a suitably patterned set of electrically independent, elongated electrical conductors on a silicon integrated circuit, and those conductors are, in turn, overcoated with a high dielectric constant, conformable material, such as indium or aluminum.

3 Claims, 6 Drawing Figures

CONFORMABLE ELECTRODES FOR PROXIMITY COUPLED ELECTRO-OPTIC DEVICES

BACKGROUND OF THE INVENTION

This invention relates to electro-optic devices and, more particularly, to proximity coupled light valves for electro-optic line printers and the like.

It has been shown that an electro-optic element having a plurality of individually addressable electrodes can function as a multigate light valve for line printing. See, for example, U.S. Pat. No. 4,281,904 on a "TIR Electro-Optic Modulator with Individually Addressed Electrodes," which issued Aug. 4, 1981 on an application of R. A. Sprague et al. Also see, "Light Gates Give Data Recorder Improved Hardcopy Resolution," *Electronic Design*, July 19, 1979, pp. 31–32; "Polarizing Filters Plot Analog Waveforms," *Machine Design*, Vol. 51, No. 17, July 26, 1979, p. 62; and "Data Recorder Eliminates Problem of Linearity," *Design News*, Feb. 4, 1980, pp. 56–57.

As is known, almost any optically transparent electro-optical material can be used as the electro-optic element of such a light valve. The most promising materials now appear to be $LiNbO_3$ and $LiTaO_3$, but there are others which merit consideration, including BSN, KDP, $KD^xP$, $Ba_2NaNb_5O_{15}$ and PLZT.

To control the light valve, the electrodes are proximate the electro-optic element and are distributed widthwise thereof, typically on equidistantly spaced centers. For certain applications, such as high resolution line printing, the electrodes are densely packed on centers of, say, ten microns or even less. Fortunately, it has been found that the electrical interface for such a light valve can be significantly simplified if the electrodes are fabricated on a separate substrate, such as a silicon integrated circuit, and pressed or otherwise held closely adjacent the electro-optic element to "proximity couple" electric fields into the electro-optic element. See, a commonly assigned U.S. Pat. No. 4,396,252 of W. D. Turner, which issued Aug. 2, 1983 on "Proximity Coupled Electro-Optic Devices," and a commonly assigned U.S. Pat. No. 4,367,925 of R. A. Sprague et al., which issued Jan. 11, 1983 on "Integrated Electronics for Proximity Coupled Electro-Optic Devices."

However, experience with proximity coupled multigate light valves has demonstrated that it is difficult to obtain highly efficient and uniform coupling. The inherent surface roughness of the electrodes, minor localized defects in the mating surfaces of the electrodes and the electro-optic element, and even dust particles or other particulates entrapped between those surfaces tend to create an irregular gap. A commonly assigned U.S. Pat. No. 4,482,215 of R. A. Sprague et al, which issued Nov. 13, 1984 on "Mechanical Interface for Proximity Coupled Electro-Optic Devices," suggests mechanically gapping the electrodes a predetermined nominal distance from the electro-optic element, thereby reducing the effect of the gap irregularities on the uniformity of the fields that are coupled into the electro-optic element. Furthermore, another commonly assigned U.S. Pat. No. 4,370,029 of R. A. Sprague et al., which issued Jan. 25, 1983 on "Dielectric Interface for Proximity Coupled Electro-Optic Devices," suggests filling the gap with a material having a high dielectric constant to provide even more uniform and efficient coupling. In short, these prior proposals have acknowledged the existence of a gap between the electrodes and the electro-optic element and have attempted to reduce its adverse effects.

SUMMARY OF THE INVENTION

Now, however, it has been found that the gap between the electrodes and the electro-optic element of a proximity coupled electo-optic device, such as a multigate light valve, can be substantially eliminated, thereby improving its coupling characteristics. To that end, in accordance with the present invention, the electrodes are formed from or are overcoated with a soft or readily softenable (a) electrically conductive material, such as indium or aluminum, or (b) material having a relatively high dielectric constant, so that the electrodes flow while in a solid state to conform to the electro-optic element when pressed thereagainst. For example, standard smeiconductor fabrication techniques may be utilized to fabricate a suitably patterned set of electrically independent, elongated electrical conductors on a silicon integrated circuit, and those conductors may, in turn, be overcoated with a conformable, electrically conductive or high dielectric constant material through the use of, say, an electroless coating process, an electroplating process, or a vapor deposition process.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with reference to a particular embodiment, it is to be understood that there is no intent to limit it to that embodiment. On the contrary, the aim is to cover all modifications, alternatives and equivalents falling within the spirit and scope of the invention as defined by the appended claims.

Figure 1:
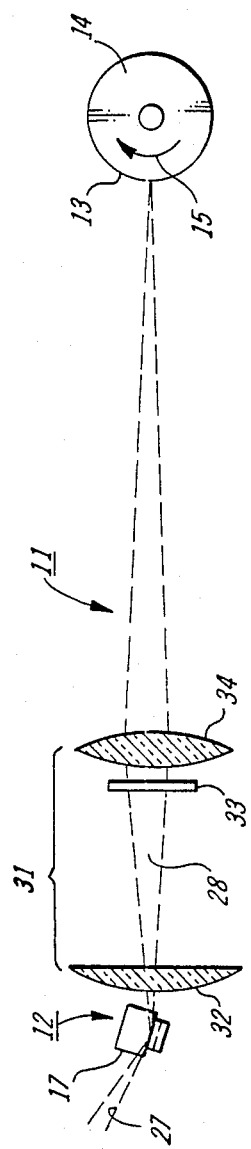
FIG. 1 is a schematic side view of an electro-optic line printer including a proximity coupled TIR multigate light valve constucted in accordance with the present invention.
Figure 2:
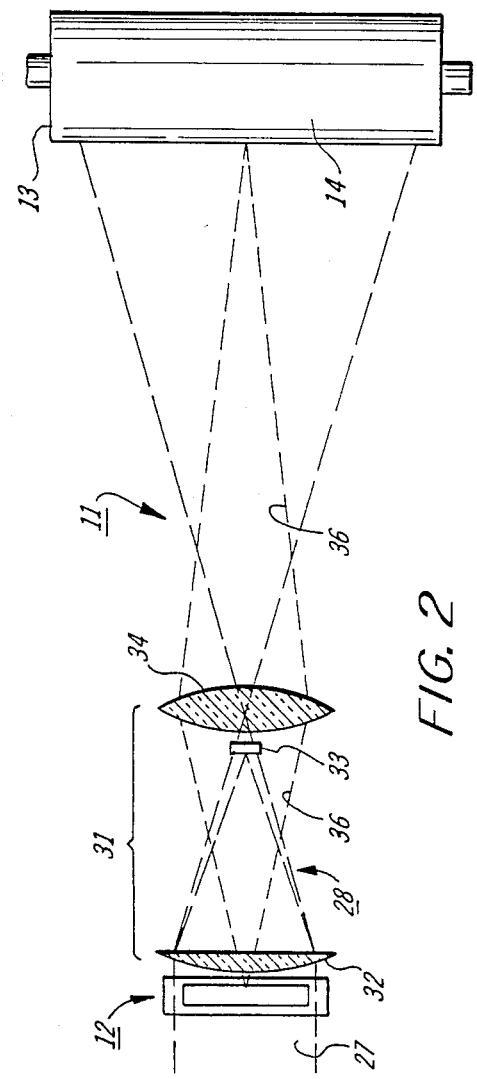
FIG. 2 is a schematic bottom plan view of the printer.

Turning now to the drawings, and at this point especially to FIGS. 1 and 2, there is an electro-optic line printer 11 comprising a multigate light valve 12 for exposing a photosensitive recording medium 13 in an image configuration. The recording medium 13 is depicted as being a photoconductively coated xerographic drum 14 which is exposed while rotating in the direction of the arrow 15. However, it will be evident that other recording media could be employed; including photoconductively coated xerographic belts and plates, and photosensitive films and coated papers in web or cut sheet stock form. Therefore, the recording medium 13 is most aptly described as being a photosensitive medium which is exposed in an image configuration while advancing in a cross line direction relative to the light valve 12.

Figure 3:
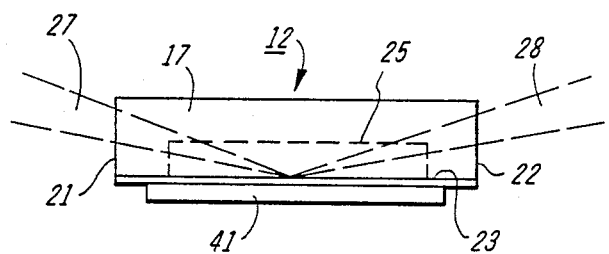
FIG. 3 is an enlarged side view of the TIR light valve shown in FIGS. 1 and 2.
Figure 4:
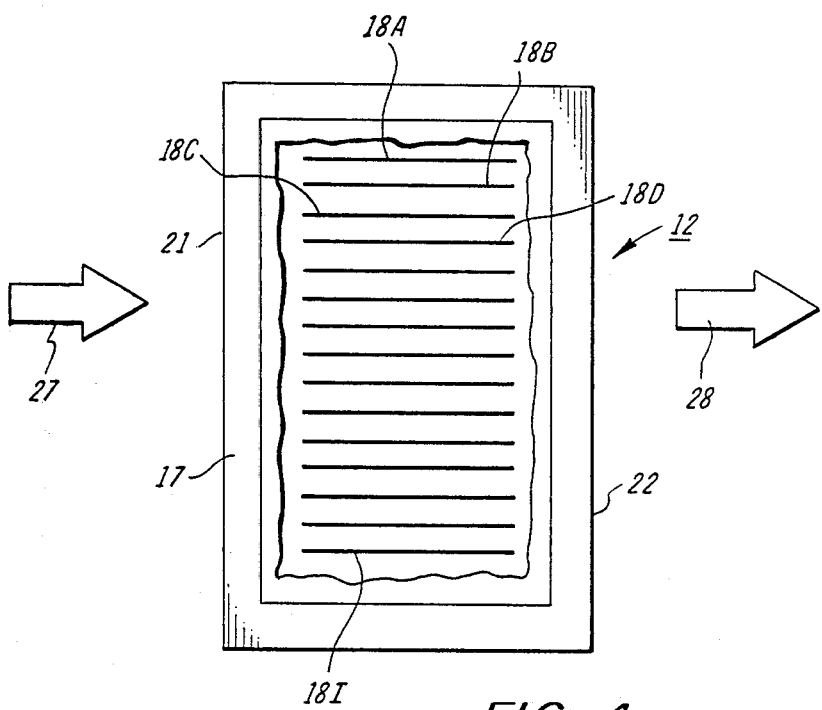
FIG. 4 is an enlarged cutaway bottom view of the light valve to illustrate a typical pattern for its individually addressable electrodes.

As shown in further detail in FIGS. 3 and 4, the light valve 12 includes an electro-optic element 17 and a plurality of individually addressable electrodes 18a–18i. This particular light valve 12 is designed to operate in a total internal reflection (TIR) mode. Thus, the electro-optic element 17 suitably is an optically polished, y-cut crystal of, say, $LiNbO_3$ having an input face 21, an output face 22, and an intermediate or longitudinal reflecting surface 23. The electrodes 18a–18i, on the other hand, are distributed across essentially the full width of the electro-optic element 17 and are proximate its reflecting surface 23, so that electric fringe fields 29 (FIG. 6) may be proximity coupled into an interaction region 25 within the electro-optic element 17, as subsequently described. Typically, the electrodes 18a–18i are 1–30 microns wide and are on centers which are more or less equidistantly separated to provide a generally uniform interelectrode gap spacing of 1–30 microns.

In operation, the light valve 12 is illuminated by a sheet-like collimated light beam 27 from a suitable source, such as a laser (not shown). The input or incident light beam 27 passes through the input face 21 and fills essentially the full width of the electro-optic element 17. For a TIR mode of operation, the input beam 27 is applied to the electro-optic element 17 at a grazing angle of incidence relative to its reflecting surface 23 and is brought to a wedge shaped focus (by means not shown) at approximately the longitudinal centerline of that surface. Accordingly, the input beam 27 is totally internally reflected from the reflecting surface 23 to provide an output beam 28 which exits from the electro-optic element 17 through its output face 22.

To accommodate the illustrated embodiment, data is applied to the electrodes 18a–18i in differentially encoded form, thereby avoiding the need for common or ground plane electrodes. While differential encoding and its use in electro-optic line printers are described in substantial detail in a copending and commonly assigned U.S. Pat. No. 4,450,459 of W. D. Turner et al., on "Differential Encoding for Fringe Field Responsive Electro-Optic Line Printers," a brief review of the process may be helpful. To that end, it is noted that image information typically is conveyed to the printer 11 as a serial stream of raw data samples which are referenced to a common potential, such as ground. Consequently, to preserve the information content of the those samples while reducing the number of electrodes required by a factor of almost two, the data is differentially encoded (by means not shown) in accordance with an encoding rule which causes the first differentially encoded sample for each line of the image (i.e., the one that will be applied to the electrode 18a) to remain referenced to the common or ground potential, but each of the others to have a magnitude whose difference from the immediately preceeding differentially encoded sample corresponds to the magnitude of a respective raw input data sample. In practice, the differentially encoded data samples for successive lines of the image are sequentially applied to the electrodes 18a–18i (by means not shown) in timed synchronism with the printing of those lines, whereby all picture elements for any given line of the image are faithfully represented by the electrode-to-electrode voltage drops which exist while such line is being printed.

Figure 6:
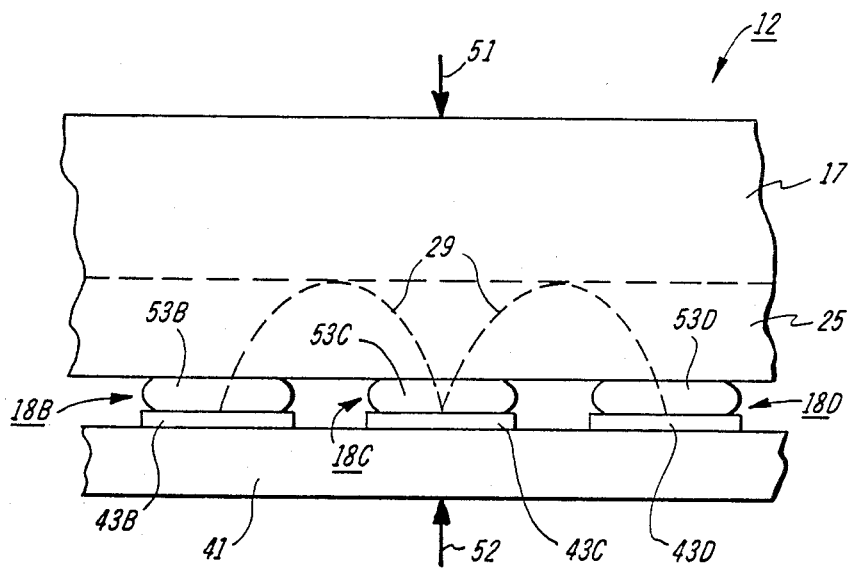
FIG. 6 is an enlarged fragmentary sectional view of the light valve to better illustrate the conformable electrodes which are provided in accordance with this invention.

Referring to FIG. 6, it will be seen that the voltage drops between the electrodes 18a–18i create localized electrical fringe fields 29 which penetrate into the interaction region 25 of the the electro-optic element 17, thereby producing transverse localized variations in its refractive index. As a result, the light beams 27 and 28 are spatially phase front modulated as they pass through the interaction region 25 in accordance with the data applied to the electrodes 18a–18i, thereby converting the picture element information from electrical to optical form. The modulation is a function of the diffraction the light beams 27 and 28 experience while passing through the interaction region 25. For that reason, the electrodes 18a–18i have projections of substantial length along the optical axis of the electro-optic element 17. As shown, the electrodes 18a–18i may be aligned generally parallel to the optical axis of the electro-optic element 17 for a TIR axial mode operation of the light valve 12. Alternatively, the electrodes 18a–18i may be tilted at the so-called Bragg angle relative to that axis to cause the light valve 12 to operate in a TIR Bragg mode.

As shown in FIGS. 1 and 2, to image the light valve 12 onto the recording medium 13, there suitably are Schlieren central dark field imaging optics 31 which are optically aligned between the electro-optic element 17 and the recording medium 13. The imaging optics 31 convert the spatial phase front modulation of the output beam 28 into a correspondingly modulated intensity profile and provide any magnification that is required to form an image of the desired width on the recording medium 13. To accomplish that, as shown, the imaging optics 31 typically include a field lens 32 for focusing the zero order diffraction components of the output beam 28 onto a central stop 33 and an imaging lens 34 for imaging its higher order diffraction components onto the recording medium 13. The field lens 32 is optically aligned between the electro-optic element 17 and the stop 33 so that substantially all of the zero order components of the output beam 28 are physically blocked or filtered out. However, the higher order diffraction components of the output beam 28 scatter around the stop 33 and are collected by the imaging lens 34 which, in turn, causes them to fall onto the image plane defined by the recording medium 13.

Of course, other phase sensitive readout optics could be used to convert the phase front modulation of the output beam 28 into a correspondingly modulated intensity profile as required to effectively expose the recording medium 13. Indeed, if the input beam 27 is appropriately polarized, the light valve 12 can effectively function as a spatial polarization modulator. In that event, a standard polarization analyzer (not shown) would be used to convert the spatial polarization modulation of the output beam 28 into a correspondingly modulated intensity profile.

Summarizing the basic operation of the line printer 11, it will now be understood that the light valve 12 and the readout optics 31 cooperate to provide a plurality of independent modulators for printing picture elements at predetermined positions along each line of an image. That is, as indicated in FIG. 2 by the shorter dashed lines 36, each neighboring pair of electrodes, such as the electrodes 18b and 18c (FIG. 4), controls the exposure or printing of picture elements at a unique, spatially predetermined position along each line of the image. Thus, it will be evident the number of individually addressable electrodes 18a–18i embodied by the light valve 12 determines the number of picture elements that it can print on any given line of an image.

Figure 5:
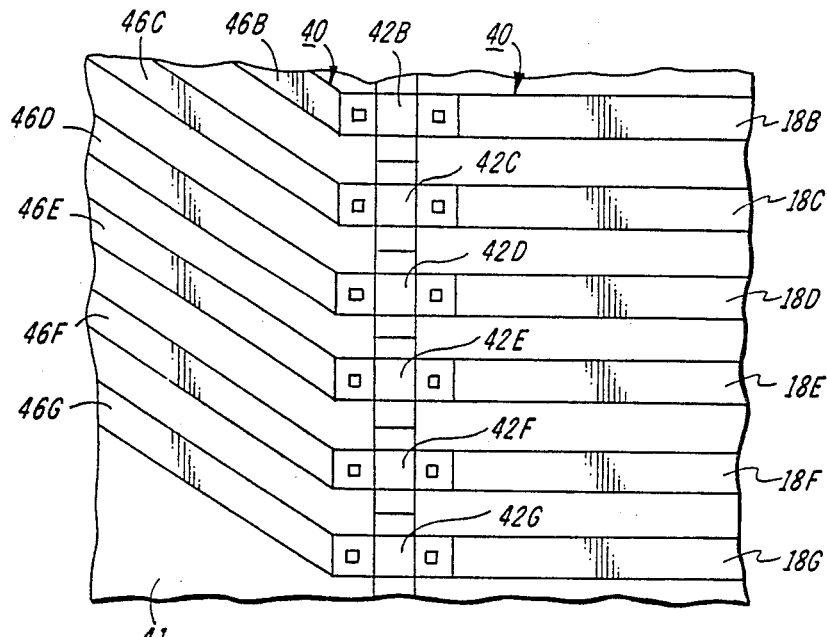
FIG. 5 is an enlarged fragmentary plan view of the electrodes for the light valve as embodied on an integrated circuit.

Referring now to FIGS. 3–5, the electrodes 18a–18i preferably occupy a portion of a suitably patterned, electrically conductive layer, generally indicated by 40, which is deposited on and incorporated in an integrated circuit 41, such as a LSI (large scale integrated) silicon integrated circuit. In that event, the addressing and drive electronics (shown only in relevant part) for the electrodes 18a–18i may be contained by the integrated circuit 41, thereby simplifying the electrical interface of the light valve 12. For example, the electrically conductive projections 43b–43d (FIG. 6) for the electrodes 18b–18e, respectively, are a patterned extension of the metalization or polysilicon layer 40 (FIG. 5) through which the output transfer gates or pass transistors 42b–42g are connected to the other addressing and drive electronics.

In accordance with the present invention, the electrodes 18a–18i are formed from or are overcoated with a composition which flows at a moderate, sub-melting point temperature to conform to the reflecting surface 23 of the electro-optic element 17 when the electrodes 18a–18i are pressed thereagainst, as indicated in FIG. 3 by the arrows 51 and 52. For example, as shown in FIG. 6, the electrode-like projections 43b–43d have soft overcoatings 53b–53d, respectively, which conform to the reflecting surface 23 of the electro-optic element 17 due to the applied pressure, thereby ensuring that there is substantial surface contact between the electrodes 18a–18i and the electro-optic element 17. Materials such as aluminum and indium are sufficiently soft to cold flow as desired, and such materials can easily be overcoated on the projections 43b–43d by means of a more or less conventional electroless coating process, electroplating process, or vapor deposition process. However, it should be noted that the overcoating composition need not be an effective electrical conductor if its dielectric constant is sufficiently high to avoid excessive attenuation of the fringe fields 29 emanating from electrically conductive projections 43b–43d. While there are clear advantages to embodying the electrodes 18a–18i within the integrated circuit 41 as described, it should be understood that discrete circuit technology could be used and that the electrodes 18a–18i could be fabricated from a soft, electrically conductive, homogeneous composition. Indeed, indium and aluminum would also be suitable materials for such an implementation. Moreover, while the fabrication of the light valve 12 is simplified if the electrodes 18a–18i cold flow to conform to the reflecting surface 23 of the electro-optic element 17, some moderate, sub-melting point heating of the light valve 12 to increase the solid state conforming flow of the electrodes 18a–18i is within the contemplation of this invention

CONCLUSION

In view of the foregoing, it will be appreciated that the present invention provides an improved electrical interface for electro-optic light valves. Specifically, the compliance of the electrodes ensures that there is substantially gap free, uniform surface contact between the electrodes and the electro-optic element of such a light valve.

What is claimed is:

1. In a multigate electro-optic light valve having an electro-optic element, and a plurality of individually addressable electrodes engaged with said electro-optic element for proximity coupling electric fields into said electro-optic element; the improvement wherein
   said electrodes include elongated electrical conductors and a relatively soft overcoating deposited on said conductors, said overcoating being selected so that it flows in its solid state to cause said electrodes to conform to said electro-optic element, thereby providing generally uniform surface contact between said electrodes and said electro-optic element.

2. The improvement of claim 1 wherein said overcoating is a relatively poor electrical conductor but has a sufficiently high dielectric constant to avoid substantial attenuation of said fields.

3. The improvement of claim 1 wherein
   said light valve further includes an integrated circuit for applying data to said electrodes, and
   said integrated circuit comprises an electrically conductive layer patterned to define said conductors.

* * * * *